May 3, 1927.
G. S. AGEE
VINE LIFTER
Filed Oct. 30, 1924
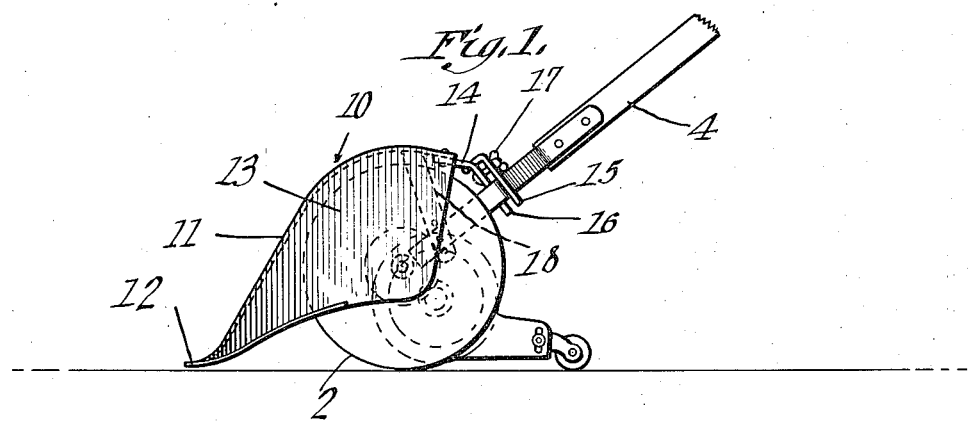
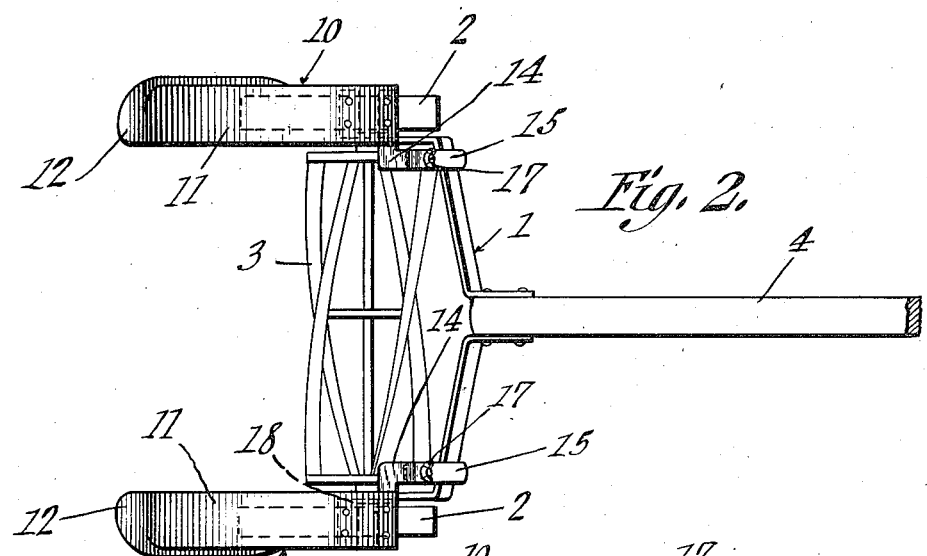
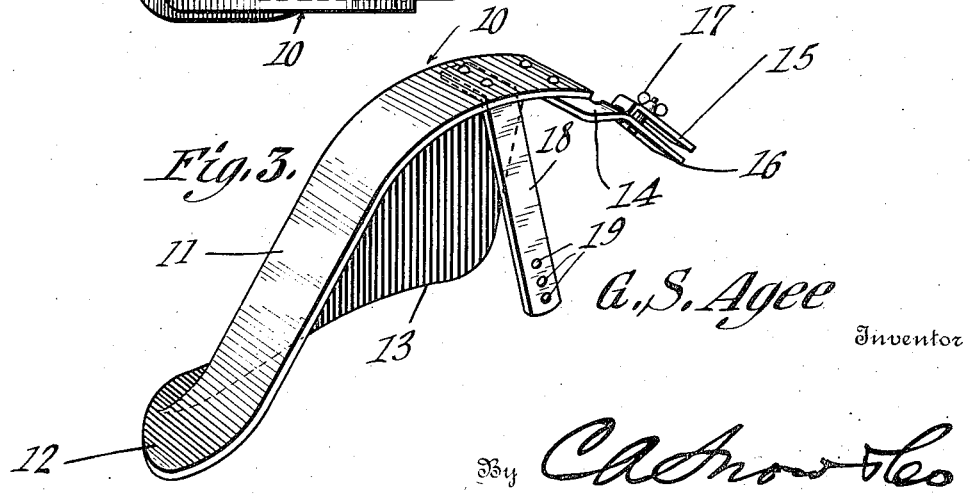
G. S. Agee
Inventor Patented May 3, 1927.

1,626,712

UNITED STATES PATENT OFFICE.

GEORGE S. AGEE, OF LONGVIEW, WASHINGTON.

VINE LIFTER.

Application filed October 30, 1924. Serial No. 746,842.

This invention relates to a wheel shield or guard to be used as a vine lifter.

The object of the invention is to so construct and mount a shield of this character that it will pick up at the surface trailing plants and vines and prevent them from being crushed by the wheels of the lawn mower or other implement to which the device is attached.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a lawn mower equipped with this improved wheel shield or vine protector;

Fig. 2 is a plan view thereof; and

Fig. 3 is a detail perspective of the shield detached.

The shield or vine lifter 10 which is shown applied to a lawn mower is designed for use on the respective wheels, being made right and left otherwise they are constructed alike and hence one only will be described in detail.

The lawn mower 1 on which this guard 10 is mounted is of ordinary construction having the usual ground wheels 2, cutting blades 3 and handle 4.

The guards or shields 10 one of which is mounted on each wheel comprises a sheet metal hood in the form of a wheel rim protecting strip 11 curved longitudinally and extended at its front to form a gradually sloping flat nose 12 which is designed when in operative position to run along in front of the wheel adjacent and parallel with the ground and operates to lift trailing vines and plants and throw them to one side preventing the wheels from cutting and mutilating them. A skirt 13 depends from the outer edge of the strip 11 and extends down preferably just below the axis of the wheel as is shown clearly in Fig. 1 and inclines downwardly and forwardly at its lower edge merging into said nose, said edge being provided with a laterally and outwardly extending flange 13ª which assists in lifting vines to be protected and prevents them from getting under the edge of the shield or guard.

As shown this protective hood 10 is mounted on the mower by means of a longitudinal rearwardly extending arm 14 bifurcated at its free end to form clamping jaws 15 and 16 which are designed to straddle the handle 4 or rather the bar constituting a part of said handle and which is secured thereto by a bolt having a wing nut 17 which when tightened will draw the jaws together and secure the device to the handle. An auxiliary fastening or supporting device is shown in the form of a bracket 18 secured to the rim member 11 and extending laterally from its inner edge being bent downwardly and outwardly and secured to the mower frame by suitable bolts. This bracket arm 18 is provided with a plurality of longitudinally spaced apertures 19 to provide for the vertical adjustability of the hood 10.

When the shield is used in connection with a lawn mower the nose 12 is adjusted to run just above the ground although the nose can be arranged in other positions relative to the ground when so desired. The rim protecting strip 11 should be wide enough to thoroughly cover the rim of the wheel in connection with which the device is used and the skirt or hood 13 should extend as low as desired, just below the axle of the wheel when used on lawn mowers.

This shield may be readily added to or removed from an implement without interfering with any of the other parts of the implement and when in use will effectively lift and throw aside trailing vines and plants preventing the wheels of the implement from passing over and crushing them.

I claim:—

1. A vine lifting attachment of the class described comprising a wheel rim protecting strip merging at its front end into a forwardly extending nose and having a stud extending from one side edge thereof and equipped at its lower edge with a laterally and outwardly extending flange, said attachment having means for detachably connecting it to a wheel supported implement.

2. A vine lifting attachment of the class described comprising a rim protecting strip merging at its front end into a nose and having a skirt extending from one side thereof, clamping jaws carried by said vine lifting attachment for detachable engagement with the frame of the implement in connection with which it is to be used, and a brace extending at right angles to said jaws for detachable engagement with the implement frame.

3. A device of the class described comprising a rim protecting strip of a width sufficient to completely shield the rim in connection with which the device is to be used, said strip being curved downwardly and forwardly and terminating in a gradually sloping nose, a skirt secured to the outer edge of said strip, clamping jaws extending rearwardly from the rear end of said strip, and an attaching bracket extending from the inner ends of the strip downwardly and outwardly and having means for adjustably connecting it with an implement frame.

In testimony that I claim the foregoing as my own, I have hereto affixed my signature.

GEORGE S. AGEE.